United States Patent [19]

Graser et al.

[11] Patent Number: 4,821,510
[45] Date of Patent: Apr. 18, 1989

[54] MULTIPLE-STAGE ROCKET MOTOR NOZZLE THROAT

[75] Inventors: Warren L. Graser, Elkton, Md.; Robert H. McCafferty, Wilmington, Del.

[73] Assignee: Morton Thiokol, Inc., Chicago, Ill.

[21] Appl. No.: 41,264

[22] Filed: Apr. 22, 1987

[51] Int. Cl.[4] .................................................. F02K 9/97
[52] U.S. Cl. ........................................ 60/242; 60/253; 60/271; 239/265.19
[58] Field of Search ................. 60/235, 242, 253, 271; 239/127.1, 127.3, 265.19

[56] References Cited

U.S. PATENT DOCUMENTS 3,309,874  3/1967  Gould .................................... 60/253
4,574,586  3/1986  Gabrysch ............................. 60/254

Primary Examiner—Louis J. Casaregola
Assistant Examiner—Timothy S. Thorpe
Attorney, Agent, or Firm—Gerald K. White

[57] ABSTRACT

The invention is concerned with reducing the effect of a progressive surface area versus web thickness relationship in a rocket motor and is particularly useful with center perforate propellant grains where the chamber pressure versus time history is generally progressive. In a very short action time rocket motor, it is desirable to keep the chamber pressure as close as practical to the peak during the entire burn to increase the propellant burn rate. The multiple-stage throat makes this possible in a motor that uses the cost effective center perforate propellant grain design and operates by allowing a first stage throat to erode at a predictable rate while the area of the propellant burning surface is increasing. The motor initial Kn (propellant surface area divided by nozzle area) is raised by using a relatively small initial size for the first stage throat and as a result the rocket motor reaches peak chamber pressure quickly. With the erosion of the first stage matching the increasing propellant surface area the chamber pressure remains nearly constant. Near the end of the burn the first stage throat erodes out to the diameter of a non-eroding second stage throat which then becomes the controlling throat.

12 Claims, 4 Drawing Sheets

MULTIPLE-STAGE ROCKET MOTOR NOZZLE THROAT

BACKGROUND OF THE INVENTION

1. Field of the Invention

The present invention relates to a multiple-stage nozzle throat for increasing the burn rate of high speed solid propellant steering rocket motors that employ a progressive center perforate propellant grain configuration.

2. Description of the Prior Art

In a rocket motor having a center perforate solid propellant grain, the chamber pressure versus time history is generally progressive. That is to say, the pressure continues to increase throughout the time of the burn. This is because the area of the propellant burning surface continues to increase during burning. When no change occurs in the nozzle area during burning, the rocket motor Kn (surface area divided by nozzle throat area) progressively increases as the propellant is consumed. Thus, a typical chamber pressure versus time trace for center perforate rocket motors comprises a continual upward slope. This characteristic of center perforate rocket motors has been the source of a serious problem known as the "weight penalty" in the art because of the need for thicker and heavier structures for containing the resulting higher motor chamber pressures.

In order to obtain the delivery of a relatively constant pressure or thrust, the use of complex grain configurations or designs, such as star perforations, have been proposed. With an appropriate choice of such a complex perforation profile, it is possible to minimize the range of variation of the propellant surface area over the entire period of the burn thereby to maintain the motor Kn, and hence, the chamber pressure relatively constant. Such complex perforation profiles, however, have introduced problems in respect of achieving very high loading density and very short action time in high pressure rapid response steering rocket motors. There are, in addition, higher manufacturing costs related to tooling and propellant loading operations.

The available envelope size and the need for very high loading density in high pressure rapid response steering rocket motors precludes the effective use of star perforation propellant grains. Additionally, the need for short action time makes it critical that the motor reach and operate at its most efficient chamber pressure very quickly.

The present invention was devised to fill the technological gap that has existed in the art in these respects.

SUMMARY OF THE INVENTION

An object of the invention is to provide a rocket motor nozzle throat that employs multiple stage operation to improve the pressure versus time history of rocket motors that utilize a progressive center perforate grain.

Another object of the invention is to provide such a multiple stage operation nozzle throat that enables the rocket motor to reach and operate at its most efficient chamber pressure very quickly.

Still another object of the invention is to provide a multiple stage operation nozzle throat that enables the achievement of very high loading density and a very short action time in high pressure, rapid response steering rockets.

A further object of the invention is to provide for center perforated profile rocket motors a multiple-stage nozzle throat that uses different materials in each stage, an eroding material in a first stage and a non-eroding material in a second stage, for accomplishing the pressure control.

In accomplishing these and other objectives of the invention, there is provided a two-stage version of the multiple nozzle throat, the first stage being made of an eroding material. This is designed to raise the motor initial Kn and thereby accelerate the attainment of peak motor chamber pressure by using a relatively small initial throat size. The second stage is made of a non-eroding material having a throat size greater than the initial throat size of the first stage and which will fix the final motor Kn when the second stage becomes the controlling throat after erosion of the first stage throat.

The staged nozzle throat operates by providing a restricted passage from the motor chamber and allowing the first stage to erode at a predictable rate while the propellant surface area is increasing. By making the erosion of the first stage of the multiple throat substantially match the increasing propellant surface area, the motor Kn may be made to remain virtually constant during the majority of the motor burn, whereby the chamber pressure similarly remains nearly constant. Near the end of the burn, the first stage throat erodes out to the diameter, and hence, the area of the second stage throat, which then becomes the controlling throat, providing a restricted passage from the motor chamber. The non-eroding second stage throat allows the pressure to increase, but only for a short time because most of the propellant then has been burned.

The final stage throat (which comprises the second stage throat in a two-stage arrangement) provides a controlled "termination point" for the motor burn and tends to minimize the variability introduced by the erosion of the first stage throat. The result is a small rocket motor with a progressive surface history which, because of the small initial first stage throat, will reach peak pressure very quickly and sustain that pressure for the duration of the burn. Reaching high pressure quickly and maintaining it substantially decreases the action time.

The various features of novelty which characterize the invention are pointed out with particularity in the claims annexed to and forming a part of this specification. For a better understanding of the invention, its operating advantages and specific objects attained by its use, reference is made to the accompanying drawings and descriptive matter in which a preferred embodiment of the invention is illustrated.

BRIEF DESCRIPTION OF THE DRAWINGS

With this description of the invention, a detailed description follows with reference being made to the accompanying drawings which form part of the specification, and of which.

DESCRIPTION OF THE PREFERRED EMBODIMENT

Figure 1:
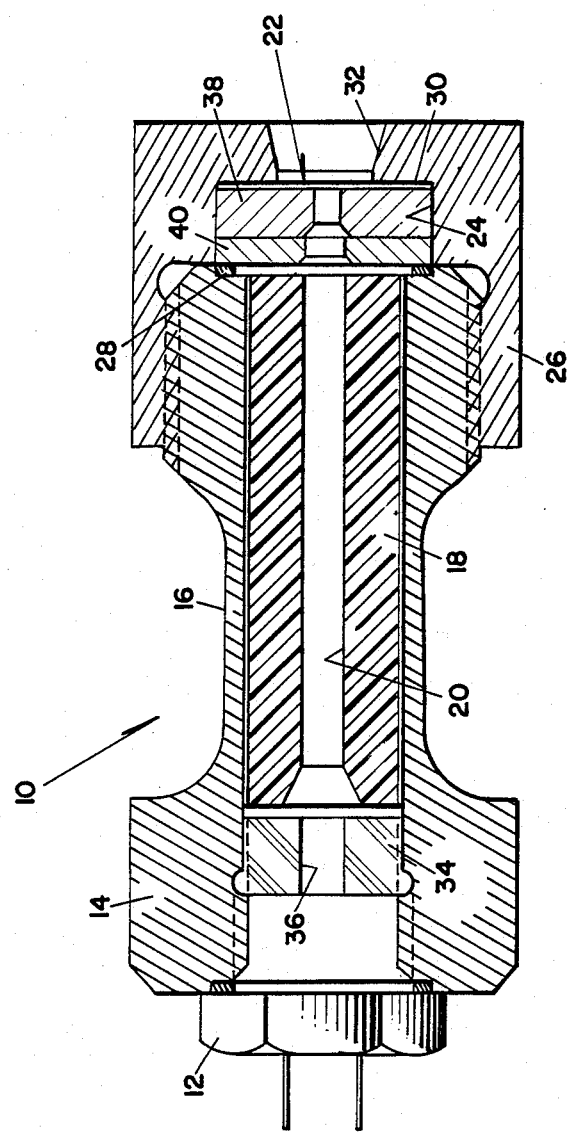
FIG. 1 is a cross sectional view of a high speed steering rocket motor using a two-stage nozzle throat according to the invention.

Referring to FIG. 1 of the drawings, the numeral 10 designates an elongated high speed steering rocket motor. The motor 10 includes an igniter 12, a cylindrical steel case 14 having a region 16 of reduced external cross section intermediate the ends thereof, a cylindrical propellant grain 18 lining the interior of the casing 14 and having a longitudinally extending center perforation 20 therein, and a two-stage nozzle 22.

Nozzle 22 is contained within a cup-like opening 24 in a nozzle body 26 and is attached thereby to the aft end of the case 14. The manner of attachment of nozzle 22 to the case 14 is by means of internal screw threads on the nozzle body 26 engaging external threads on the end of the case 14. Nozzle 22, as shown, is held suitably spaced from the end of the propellant grain 18 by a seal ring 28. An aluminum closure 30 is provided between the nozzle 22 and a flared opening 32 in the aft end of the nozzle body 26.

Igniter 12 is attached to the forward end of case 14 by screw thread means, specifically by an external thread on igniter 12 engaging an internal thread on case 14. A spacer 34 having a center perforation 36 therein is positioned between the igniter 12 and the forward end of the propellant grain 18.

In one embodiment of the invention, the constituents of the propellant grain 18 include carboxyl terminated polybutadiene (CTPB) with 4% aluminum and a flame temperature of about 5000° F. The propellant grain 18 weighed four (4) grams. A first stage throat 38 of the two-stage nozzle 22, positioned adjacent the aft end of propellant grain 18 in axial alignment with the center perforation 20, was made of mild steel with a throat diameter size of 0.063 inches and a thickness of 0.125 inches. A second stage throat 40 of nozzle 22 positioned between the end of propellant grain 18 and the first stage throat 38, was made of TZM molybdenum with a throat diameter size of 0.086 inches and a thickness of 0.063 inches.

Figure 2:
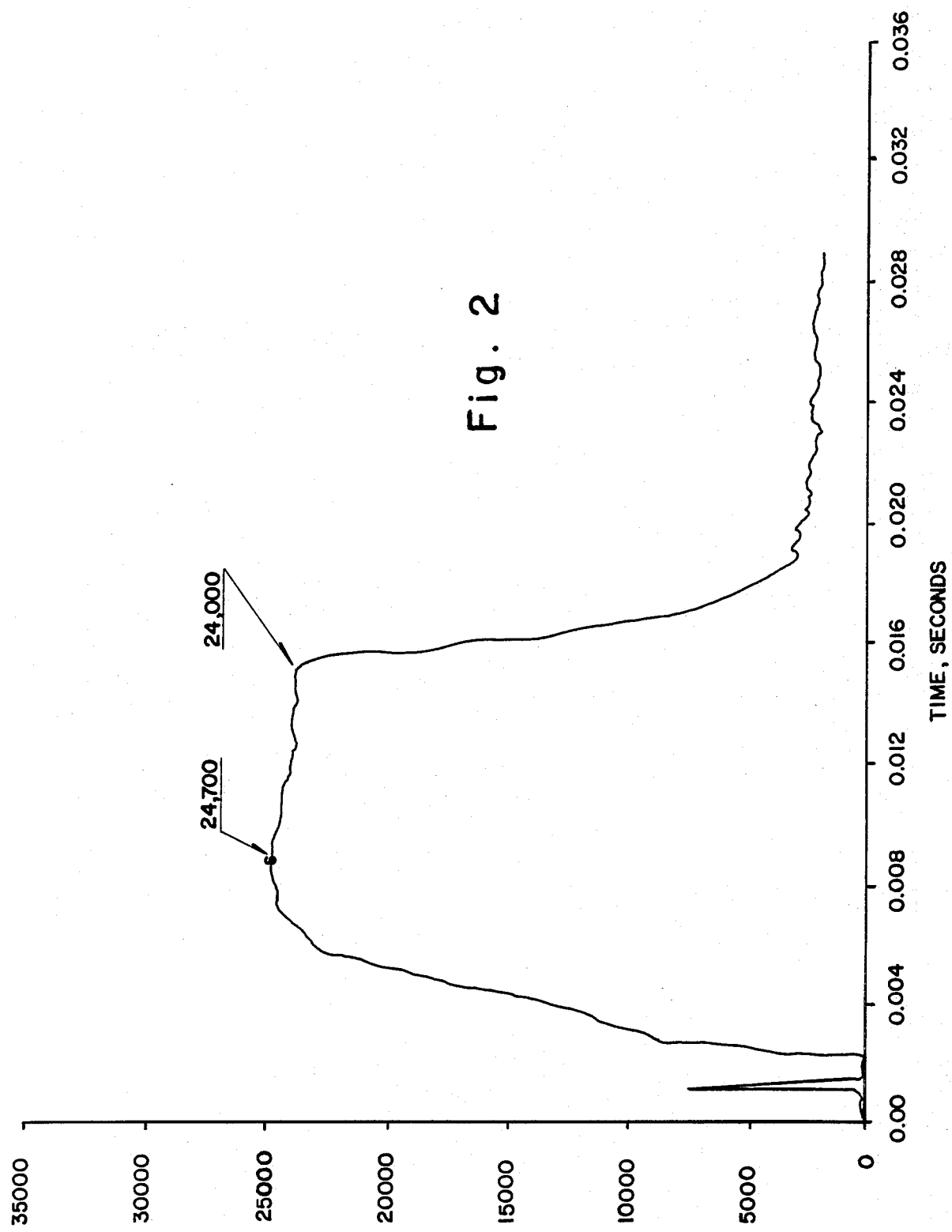
FIG. 2 is a typical chamber pressure versus time trace for the rocket motor of FIG. 1.

The high speed steering rocket motor 10 so constructed was approximately two (2) inches long and six-tenths (0.6) of an inch in diameter and operated in the range of 24,000 psi chamber pressure. A typical pressure versus time trace for this motor 10 using the two-stage nozzle throat 22 described above is shown in FIG. 2. In the trace of FIG. 2, the first 0.003 to 0.005 seconds of progressive burning are the result of flame spread across the propellant grain 18 leading up to full burning of the propellant.

The motor 10, as shown by the trace of FIG. 2, displayed an action time of 0.016 seconds. It is noted that if the motor 10 had been equipped with a single non-eroding throat nozzle designed for a similar peak pressure, the action time would have been 0.023 seconds. The two-stage nozzle 22 thus provides an action time improvement of 0.007 seconds or 30%.

Figure 3:
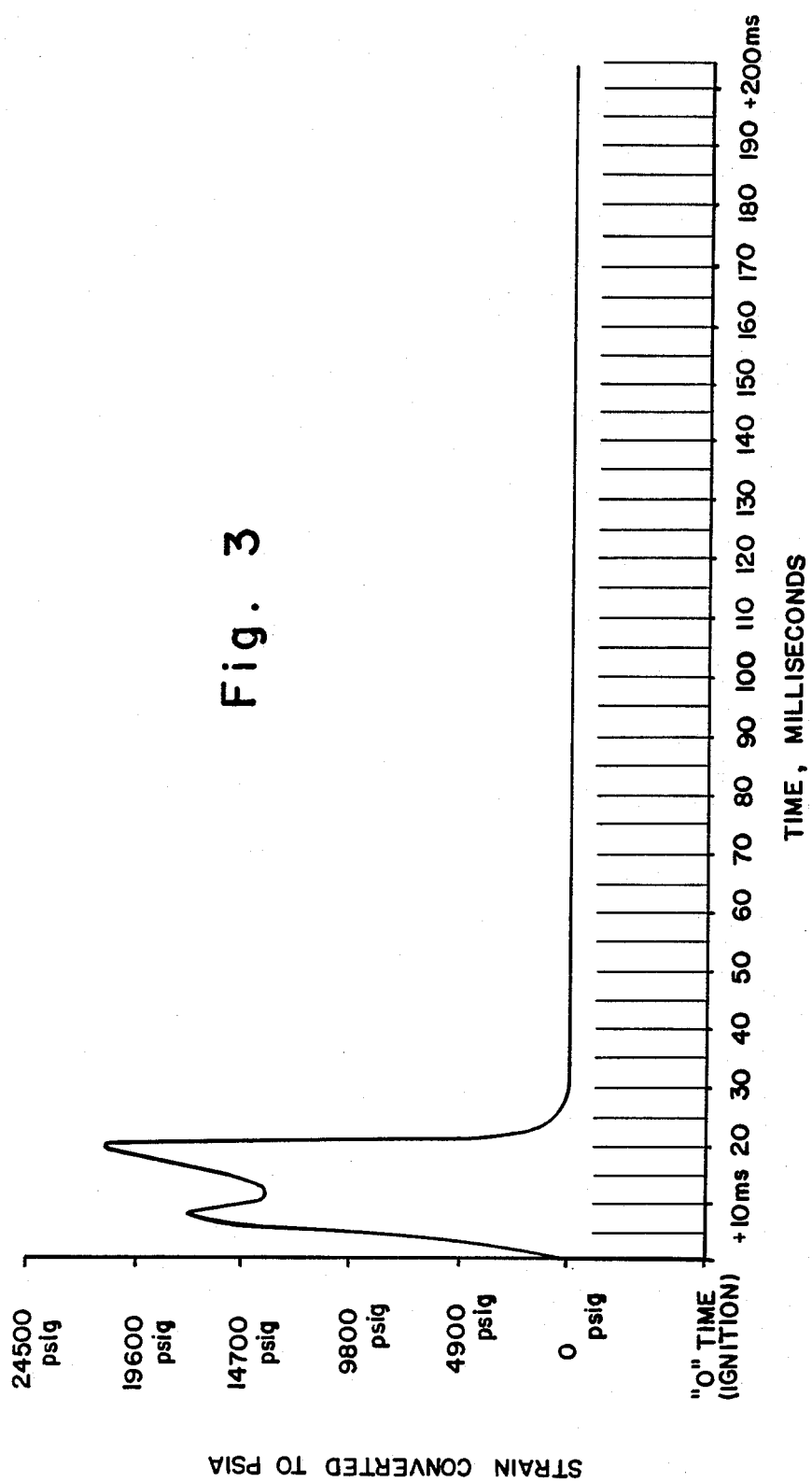
FIGS. 3 and 4 are chamber pressure versus time traces obtained with a rocket motor similar to that shown in FIG. 1 but using different materials for the first stage of the nozzle throat.
Figure 4:
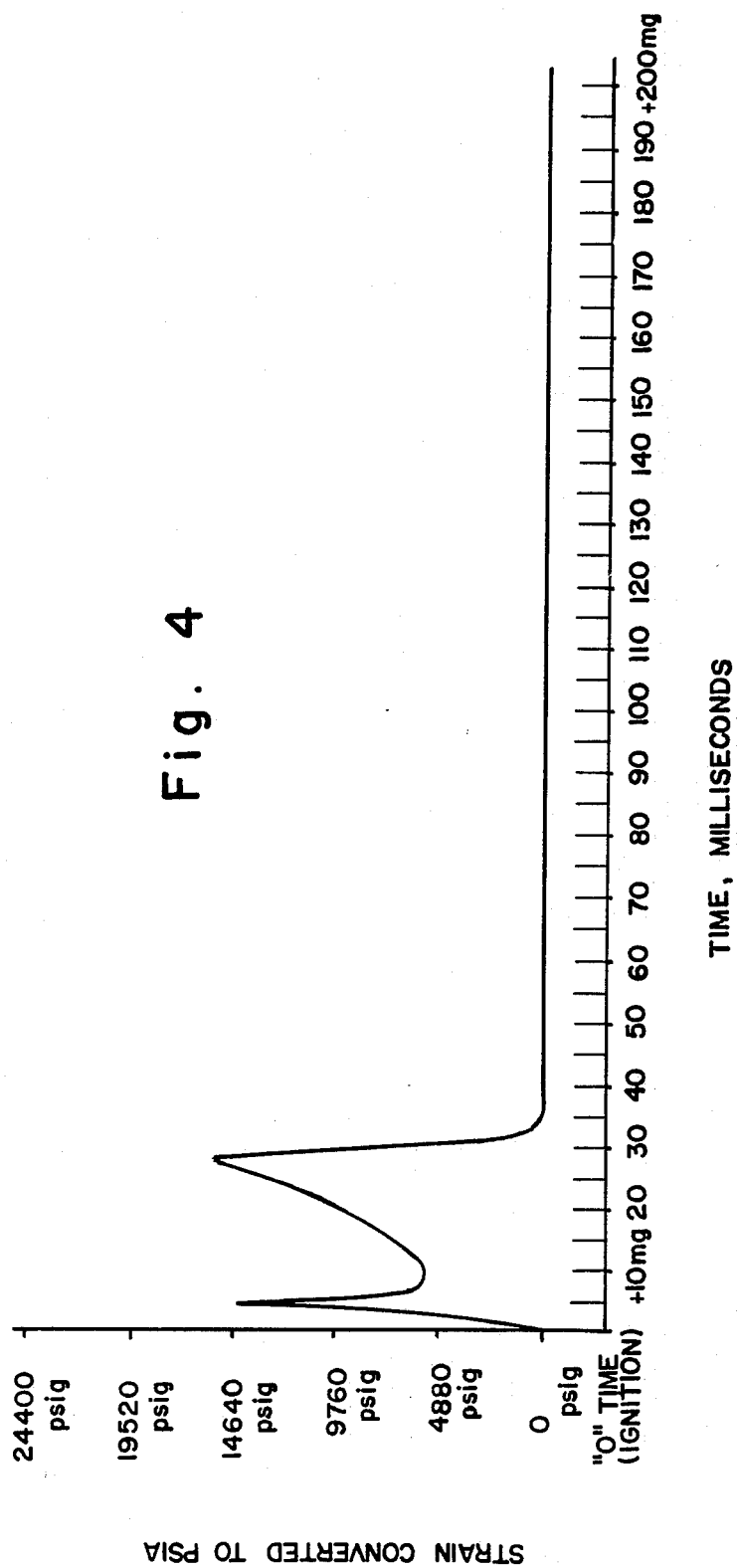

The materials for the first stage nozzle throat 38 and the second stage nozzle throat 40 can be adjusted for different propellants, or different pressure versus time requirements. Other testing with a rocket motor of the type illustrated and described in connection with FIG. 1 used stainless steel and titanium for the first stage. Typical chamber pressure versus time trace results of these tests are shown in FIGS. 3 and 4, respectively.

Reference to these figures shows that the erosion rates of the first stage materials were too high and the second stage engaged too early. These materials may be totally suitable, however, for a different propellant that results in different erosion characteristics.

Throat thickness is also an important factor in the nozzle design. It is important that the eroding stages be sized for their heat sink capability. This determines when the significant erosion begins. The thicker units begin eroding later in the burn and lead to a different profile. This can be tailored to fit the required application.

Thus, in accordance with the invention, there has been provided a multiple stage nozzle throat that solves the basic problem of how to utilize the low cost center perforate propellant grain design without suffering the penalties of a progressive burn profile and the weight and cost penalties resulting from higher chamber pressure.

The multiple-stage throat eliminates the need for star point or other complex shaped grain designs that have been required in the prior art to deliver a relatively constant pressure or thrust. A center perforate grain design and multiple throat can replace the complex grain design. Manufacturing costs related to tooling and propellant loading operations can be reduced as a result.

The multiple-stage throat also solves a major problem of achieving very high loading density and a very short action time in high pressure, rapid response steering rocket motors. The available envelope size and the need for very high loading density in this type of motor precludes the effective use of star grains. The need for short action time makes it critical that the motor reach and operate at its most efficient chamber pressure very quickly. The multiple-stage throat provides an efficacious solution to this performance problem.

With this description of the invention, those skilled in the art will appreciate that modifications may be made to the invention without departing from the spirit thereof. Therefore, it is not intended that the scope of the invention be limited to the specific embodiments illustrated and described. Rather, it is intended that the scope of the invention be determined by the scope of the appended claims.

What is claimed is:

1. A rocket motor nozzle employing multiple-stage operation for improving the pressure versus time history of rocket motors utilizing a solid propellant grain having a longitudinally extending center perforation contained within an elongated cylindrical case comprising, a nozzle body, first and second stage nozzle throats positioned within said nozzle body and attachable thereby to the end of the elongated cylindrical case in spaced axial alignment with the perforation in the propellant grain with said second nozzle throat positioned between the end of the propellant grain and said first nozzle throat, said first stage nozzle throat, when so positioned on the end of the elongated cylindrical case, providing a restricted passage in axial alignment with the perforation in the propellant grain, said first stage nozzle throat being made of a material which during burning of the propellant grain erodes at a rate such that the area of the throat increases at a rate that approximately matches the increase in the burning surface area of the propellant grain so that the ratio of the burning surface area of the propellant grain divided by the throat area of said first stage nozzle throat remains virtually constant and the pressure in the perforation of said propellant grain similarly remains nearly constant during the majority of the burn of the propellant grain, and said second stage nozzle throat being made of a noneroding material and providing a restricted passage in axial alignment with the perforation in the propellant grain after the erosion of said first stage nozzle throat, the area of said second stage nozzle throat being greater than the initial area of said first stage nozzle throat, whereby upon erosion of said first stage nozzle throat near the end of the burn of said propellant grain said second stage nozzle throat becomes the controlling throat.

2. A rocket motor nozzle as defined by claim 1 wherein the initial area of said first stage nozzle throat is made relatively small compared to the area of said second stage nozzle throat to accelerate the attainment of peak pressure in the perforation of said propellant grain.

3. A rocket motor nozzle as defined by claim 2 wherein said first stage throat is made of mild steel and said second stage throat is made of TZM molybdenum.

4. A high loading density, short action time, high pressure, rapid response steering rocket motor comprising, an elongated cylindrical rocket motor case, a solid propellant grain contained within said rocket motor case, said propellant grain having a longitudinally extending center perforation therein, means to ignite said propellant grain, and a nozzle employing multiple-stage operation for improving the pressure versus time history of the rocket motor, said nozzle comprising, first and second stage nozzle throats positioned in the end of the casing in spaced axial alignment with the perforation in the propellant grain with said second stage nozzle throat positioned between the end of said propellant grain and said first nozzle throat, said first stage nozzle throat providing a restricted passage in axial alignment with said perforation in said propellant grain and being made of a material which during burning of said propellant grain erodes at a rate such that the area of said first stage throat increases at a rate that approximately matches the increase in the burning surface area of the propellant grain so that the ratio of the burning surface area of the propellant grain divided by the throat area of said first stage nozzle remains virtually constant and the pressure in the perforation of said propellant grain similarly remains nearly constant during the majority of the burn of said propellant grain, and said second stage nozzle throat being made of a noneroding material and providing a restricted passage in axial alignment with the perforation in the propellant grain after erosion of said first stage nozzle, the area of said second stage nozzle throat being greater than the initial area of said first stage throat, whereby upon erosion of said first stage throat out to the area of said second stage throat near the end of the burn of said propellant grain said second stage throat becomes the controlling throat.

5. A high loading density, short action time, high pressure, rapid response steering rocket motor as defined by claim 4, wherein the constituents of said propellant grain include carboxyl terminated polybutadiene with 4% aluminum and the flame temperature of which is about 5000° F., wherein said first stage throat is made of mild steel, and wherein said second stage throat is made of TZM molybdenum.

6. A high loading density, short action time, high pressure, rapid response steering rocket motor as defined by claim 5, wherein said first stage nozzle throat has a throat size of about 0.063 inches and a thickness of about 0.125 inches, and wherein said second stage nozzle throat has a throat size of about 0.086 inches and a thickness of about 0.063 inches.

7. A high loading density, short action time, high pressure, rapid response steering rocket motor as defined by claim 4, wherein said cylindrical rocket motor case has a forward end and an aft end, wherein said means to ignite said propellant is attached to the forward end of said rocket motor case in igniting relation with said propellant, and wherein said nozzle employing multiple-stage operation is attached to the aft end of said rocket motor case.

8. A high loading density, short action time, high pressure, rapid response steering rocket motor as defined by claim 7, and further including a nozzle body for attaching said nozzle employing multiple-stage operation to the aft end of said rocket motor case, said nozzle body having a cup-like opening therein in which said nozzle employing multiple-stage operation is positioned, and having an aft end with a flared opening therein.

9. A high speed loading density, short action time, high pressure, rapid response steering rocket motor as defined by claim 8, further including a seal ring and a closure with said spacer ring positioned between said propellant and said nozzle employing multiple-stage operation and with said closure positioned between said nozzle employing multiple-stage operation and the flared opening in said nozzle body.

10. A high loading density, short action time, high pressure, rapid response steering rocket motor as defined by claim 9, wherein said first stage nozzle throat of said nozzle employing multiple-stage operation is positioned adjacent said closure and said second stage nozzle is positioned adjacent said seal ring.

11. A high loading density, short action time, high pressure, rapid response steering rocket motor as defined by claim 10, wherein the constituents of said propellant grain include carboxyl terminated polybutadiene with 4% aluminum and the flame temperature of which is about 5000° F., wherein said first stage nozzle throat is made of mild steel, has a throat size of about 0.063 inches and a thickness of about 0.125 inches, and wherein said second stage throat is made of TZM molybdenum, has a throat size of about 0.086 inches and a thickness of about 0.063 inches.

12. A high loading density short action time, high pressure, rapid response steering rocket motor as defined by claim 11, wherein said cylindrical rocket motor case between the forward and aft ends thereof includes a region of reduced external cross section.

* * * * *